Figures 1, 2, 3:
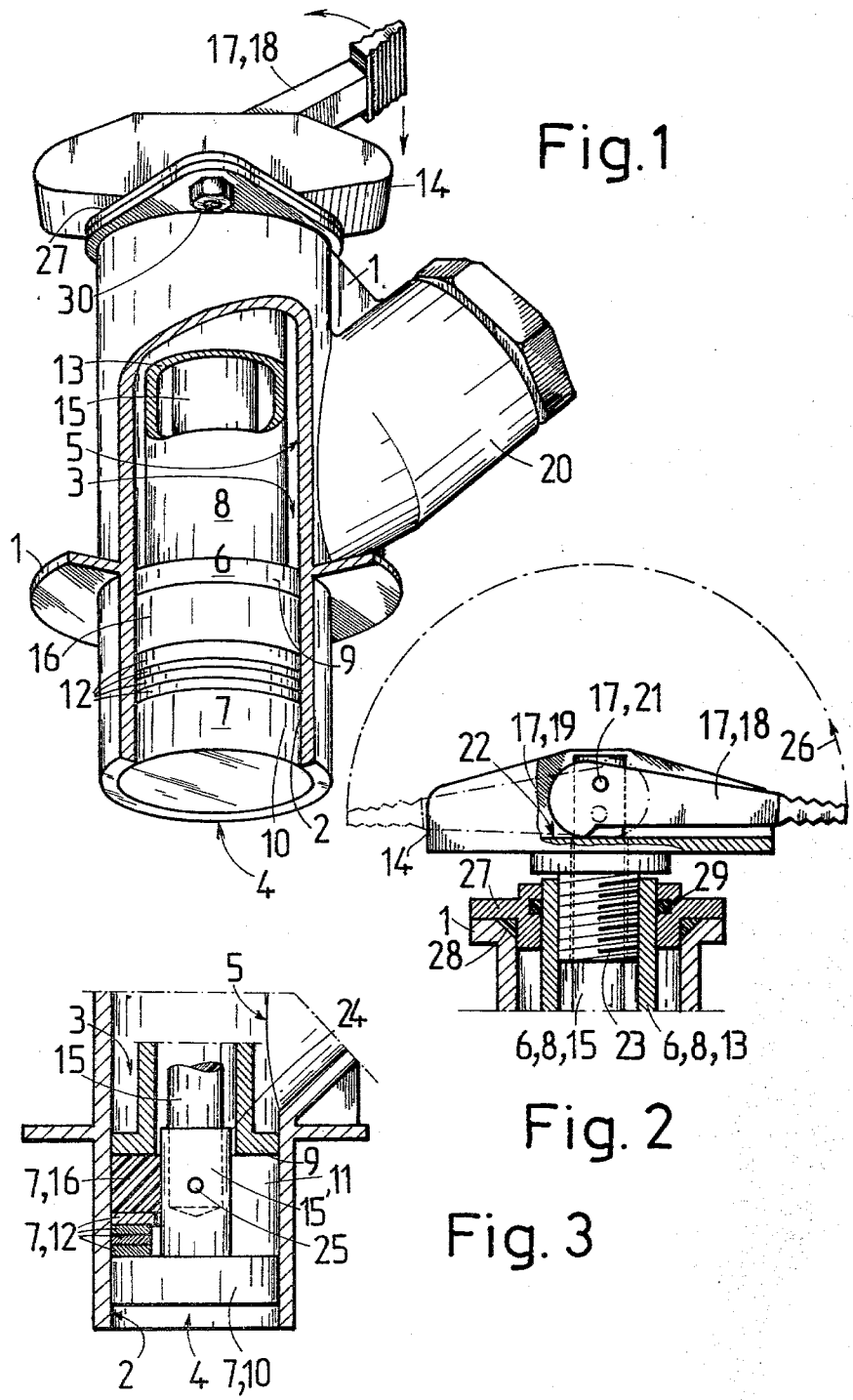

# United States Patent [19]

Marttinen

[11] 4,249,561
[45] Feb. 10, 1981

[54] PISTON TYPE CLEANING VALVE

[76] Inventor: Jarmo Marttinen, Hakolahdenkuja 4 a 2, 00200 Helsinki 12, Finland

[21] Appl. No.: 9,860

[22] Filed: Feb. 6, 1979

[30] Foreign Application Priority Data

Feb. 8, 1978 [FI] Finland ............... 780408

[51] Int. Cl.³ ............ F16K 51/00; F16K 25/00; F16K 31/44
[52] U.S. Cl. ............... 137/244; 251/189; 251/251
[58] Field of Search ........... 251/189, 191, 144, 251; 137/244, 245, 245.5, 242

[56] References Cited

U.S. PATENT DOCUMENTS

| 2,023,560 | 12/1935 | Wayer | 251/189 |
| 2,953,154 | 9/1960 | Agoliati et al. | 251/189 |
| 3,586,042 | 6/1971 | Grenier | 251/191 |
| 3,598,364 | 8/1971 | Grenier | 251/189 |
| 3,658,083 | 4/1972 | Fetterolf | 137/244 |
| 3,804,365 | 4/1974 | Fetterolf | 251/144 |

FOREIGN PATENT DOCUMENTS 423890 of 1947 Italy ....................... 251/251
24843 3/1931 United Kingdom ............ 251/251

*Primary Examiner*—Martin P. Schwadron
*Assistant Examiner*—A. Michael Chambers
*Attorney, Agent, or Firm*—McAulay, Fields, Fisher, Goldstein & Nissen

[57] ABSTRACT

A valve, comprising a body which forms a cylindrical flow channel defined by side walls and having a fluid inlet provided at one end of the channel and an outlet provided in the side wall of the channel, and a closing device which comprises a piston connected to one end of a rod. The piston is provided with an upper flange facing the rod and a lower flange facing the inlet, which therebetween define a groove with at least two piston rings fitted therein. The piston rings are preferably in contact with each other. The rod may further comprise a push pipe and a pull rod extending through the push pipe, the upper flange being connected to the push pipe and the lower flange to the pull rod and the gap between the upper flange and piston rings being fitted with a sealing ring of a flexible material.

6 Claims, 3 Drawing Figures

U.S. Patent  Feb. 10, 1981  4,249,561

PISTON TYPE CLEANING VALVE

The present invention relates to a valve consisting of a body which forms a cylindrical flow channel defined by side walls and provided at one end and a side wall with a fluid inlet and outlet, and of a closing device comprising a piston fitted at one end of a rod, the piston thus being movable in the flow channel into a position between inlet and outlet for closing the valve and at least partially past the inlet for opening the valve.

In piston valves, the adherence of impurities to side walls of a flow channel hampers the movement of piston in the flow channel. In the worst case such impurities might block the flow channel completely. Problems are particularly encountered in ships' seacocks subjected to contact with seawater and in the valves employed in process industry. The defective operation caused by impurities hampers maintenance work and replacement of valves.

The object of the present invention is to overcome the above drawback and to provide a new type of valve not handicapped by such drawback. As to the characterizing features of the invention, reference is made to the accompanying claims.

The invention is based on the use of piston rings in the closing means of a valve. Piston rings are suitably fitted side by side in a piston groove in such a way that the piston rings are in contact with each other. When such a closing means, which is provided with a plurality of piston rings, is moved in the flow channel of a valve, a deposit on channel wall is partly sheared off on hitting the first piston ring which, with the deposit firmly fixed to the wall, depresses inwards and passes the deposit. The edge of the following ring likewise shears off some of the deposit with the following doing the same etc. Thus impurity deposits are step by step sheared loose by virtue of piston rings which form part of the piston.

The valve according to the invention, for example, ensures undisturbed supply of cooling water for the vessel's engine or guaranteed discharge of the vessel's waste. If necessary, the valve closing means can be used for scraping, by means of a plurality of shearing piston components, the entire length of the flow channel of the valve to clean it of seashells, weed, and solids and molluscs without lifting the vessel from water or diving underneath to clean the valve inlet. Scraping can be effected from inside the vessel by employing the closing means which is part of the valve and has sharp slide face edges of small areas in contact with the flow channel and, moreover, due to this construction, clearance between the closing means and flow channel is considerable. By virtue of the above viewpoints, there is no risk of jamming of said means due to insufficient use, which has often been the case in prior art valves.

The following is a detailed description of the invention with reference made to the accompanying work examples and drawings, in which:

FIG. 1 shows one embodiment of the valve according to the invention in partially opened position, FIG. 2 shows a drive device and drive means of a closing means of the valve according to FIG. 1 as well as the connection of piston rod to the valve body in partial section, FIG. 3 shows the piston of the closing means in the flow channel likewise in partial section.

A valve according to the invention of FIG. 1 consists of a body 1 which comprises a cylindrical flow channel 3 (filled by closing device 6 in the figure) defined by side walls 2. One end of flow channel 3 opens downwards to provide a fluid inlet 4 and the side wall of the channel is provided with a fluid outlet 5. In channel 3 is fitted a closing device 6 comprising a piston 7 with its rod 8. Piston 7 is displaceable in the flow channel to a position between inlet 4 and outlet 5 for closing the valve as well as at least partially past the outlet 5 for opening the valve.

According to the invention, piston 7 comprises an upper flange facing the rod 8 and a lower flange 10 facing the inlet 4, between which there is formed a groove 11, i.e. the flanges are located at a distance from each other. Between the flanges, there are at least two piston rings 12.

In FIG. 1, the lowest three piston rings are of equal width and the fourth ring is of double width as compared to the lower ones. The faces of piston rings 12 pressing against the side wall 2 of flow channel 3 have sharp edges. Piston rings 12 lie side by side in contact with each other.

In the embodiment illustrated in FIGS. 1 to 3, the rod 8 of closing means 6 consists of a bushed push pipe 13 and a pull rod 15 movably fitted therein. Pull rod 15 extends through the push pipe and is provided with drive means 17 for moving the pull rod in the push pipe and for locking it therein. The upper flange 9 of piston 7 is further secured to push pipe 13 and the lower flange is secured to pull rod 15. Between the upper flange 9 and piston rings 12 is fitted a sealing ring 16 of a flexible material, such as rubber or plastics. The diameter of sealing ring 16 is smaller than that of the flanges 9, 10 which, on the other hand, is smaller than the diameter of piston rings 12 and flow channel 3. Push pipe 13 is provided with a drive means 14, such as a handle, which is connected to push pipe by means of threads 23.

Drive means 17 for pull rod 15 consist of a swing arm 18 linked to the upper end of push rod by means of a pivot pin 21 and comprising an eccentric tightening means 19 bearing against the bearing surface 22 of drive means 14, i.e. against the push pipe by means of said drive means.

In FIG. 3, the lower end 15' of pull rod 15 is connected to the lower flange 10 of piston 7 by means of an integral mounting socket 24 and a locking pin 25. FIG. 3, in which piston rings 12 and sealing rubber 16 are not depicted on the right-hand side of pull rod 15, clearly shows a groove 11, i.e. a space between the flanges 9, 10, in which piston rings and sealing rubbers are fitted.

In operation of the valve, as depicted in FIG. 2, the swing arm 18 is turned in the position shown by dot-and-dashed lines in the direction of arrow 26, the eccentric surface 19, as it is bearing against surface 22, permits the downward depression of pull rod 15. Thus the lower flange 10 draws away from the upper flange 9 (FIG. 3), and as the pressure applied by the flanges 9 and 10 to the sealing rubber 16 slackens, the diameter of sealing rubber 16 contracts so as to become smaller than that of flow channel 3. Simultaneously the sealing between piston 7 and the wall 2 of channel 3 ceases. When the piston 7 is reciprocated by means of rod 8 and handle 14 up and down, the edges of cross-sectionally rectangular piston rings 12 shear off impurities adhered to walls 2 in alternating manner. Thus, wall 2 is effectively cleaned. The valve can be closed by moving the piston 7 between the fluid inlet 4 and outlet 5 and by locking the piston in this position by means of swing arm 18 in reversed order with respect to the above-described opening operation. The valve is correspondingly opened by moving piston 7 above the outlet 5, in other words, over to the opposite side of outlet 5 with respect to inlet 4.

For storage and transport the threading 23 between drive device 14 and push pipe 13 is loosened, so that push pipe 13 together with its lower flange 10 descends, whereby all pressure strain on the rubber sealing 16 disappears. The gap in closing means 6, i.e. between push pipe 13 and side walls 2, is sealed or packed by means of a flange 27. Between flange 27 and valve body 1 is fitted a sealing 28 and between the flange and push pipe 13 is fitted a sealing 29. Flange 27 is secured to valve body 1 by bolts 30.

The valve is well suitable to be used as a seacock of a vessel, for example. In this case, the valve is preferably fitted, so that the lower face of the lower flange 10 of piston 7 is flush with the lower face of the side walls 2 of flow channel 3 and with the bottom of the vessel, with the valve in closed position. This fitting prevents the formation of unnecessary flow resistance.

Another advantageous field of use for the valve is process industry in facilities wherein flowing fluid causes blockings and operational defections of valves.

The above embodiments have been described by way of example only in order to illustrate but not to limit the invention in any way.

The piston rings 12 may be shaped in such a manner that the side faces of the rings are in an angle of 45–135 degrees of generally in a oblique angle in respect of the outer face, i.e. the face which is against the sidewalls 2 of the flow channel 3.

I claim:
1. A self-cleaning valve comprising:
   a body having a cylindrical flow channel therein and provided with a fluid inlet at one end of said channel and an outlet in a side wall of said channel;
   a closing device associated with said body comprising an actuating member and a piston unit connected to said actuating member, said piston unit being displaceable in said flow channel into a closing position between said inlet and said outlet for closing said valve and into an opening position for allowing communication between said inlet and said outlet for opening the valve, said piston unit including a sealing ring of resilient material and at least two piston rings;
   said actuating member comprising:
   a first actuating means including a push pipe associated therewith, a second actuator means including a pull rod extending through said push pipe for moving said pull rod within said pull pipe and for locking said push rod in said pull pipe closing said valve;
   said piston unit further including a first flange connected to said push pipe, a second flange connected to said pull rod, and said flanges being spaced apart from each other axially and defining a piston and having a gap therebetween; and,
   said sealing ring of resilient material and said at least two piston rings being fitted within said gap, said piston rings and said resilient material together with said piston defining said piston unit, the diameter of said sealing ring being smaller than the diameter of said piston rings in an unlocked position of said second actuator means whereby said piston rings shear off impurities adhered to the wall of said flow channel during movement of said piston rings in contact with said wall during displacement of said piston unit in said flow channel when moved from its closing position to its opening position and vice-versa to clean said wall.

2. The self-cleaning valve according to claim 1, wherein
   said piston rings are provided with sharp edges which press against said side wall of said flow channel whereby the edges of the piston rings shear off impurities adhered to said side wall.

3. The self-cleaning valve according to claim 1, wherein
   the diameter of said flanges being smaller than that of said piston rings.

4. The valve according to claim 1, including
   a screw thread connecting said first actuator means to said push pipe.

5. The valve according to claim 1, 2, 3 or 4, wherein
   said first actuator means comprises a handle extending transversely of said pipe; and,
   said second actuator means comprises a swing arm linked to said pull rod in a plane parallel to the axis of the rod, said swing arm including an eccentric tightening means supported against said push pipe to lock said pull rod against said push pipe.

6. The valve according to claim 1, wherein said piston rings are in contact with each other.

* * * * *